United States Patent
Chou

(10) Patent No.: US 7,211,959 B1
(45) Date of Patent: May 1, 2007

(54) SOUND CONTROL FOR CHANGING LIGHT COLOR OF LED ILLUMINATION DEVICE

(76) Inventor: Peter Chou, No. 6, Alley 22, Lane 152, Sec. 2, Mincyuan E. Rd., Jhongshan District, Taipei City 104 (TW)

( * ) Notice: Subject to any disclaimer, the term of this patent is extended or adjusted under 35 U.S.C. 154(b) by 0 days.

(21) Appl. No.: 11/295,576

(22) Filed: Dec. 7, 2005

(51) Int. Cl.
  *H05B 37/00* (2006.01)
(52) U.S. Cl. ........................ 315/149; 362/800
(58) Field of Classification Search ............... 362/103, 362/86, 559, 186, 800; 315/149, 158, 159
  See application file for complete search history.

(56) References Cited

U.S. PATENT DOCUMENTS 6,278,366 B1 * 8/2001 Fletcher et al. ............. 340/542
6,623,326 B2 * 9/2003 Judkins ....................... 446/175

* cited by examiner

*Primary Examiner*—David Vu
(74) *Attorney, Agent, or Firm*—Rosenberg, Klein & Lee

(57) ABSTRACT

A LED (light emitting diode) illumination device includes a ceramic substrate to integrate a plurality of LED dies and a control circuit together so that a volume of the LED illumination device can be reduced and the heat dissipation of the LED illumination device can be enhanced. The LED illumination device utilizes sound control to change the light emitted from each LED die, so that the illuminating light mixed from the emitting light of the LED dies of the LED illumination device can vary in color and brightness according to the tempo and volume of music, for example, to provide more cheerful and joyful feeling.

12 Claims, 3 Drawing Sheets

SOUND CONTROL FOR CHANGING LIGHT COLOR OF LED ILLUMINATION DEVICE

BACKGROUND OF THE INVENTION

1. Field of the Invention

The present invention relates to a light emitting diode (LED) illumination device, and more particularly, to a sound control for changing light color of a LED illumination device.

2. Description of the Prior Art

A LED lamp is different from the conventional tungsten lamp which needs large current for illumination. The LED is a semiconductor component which illuminate lights via electrons and holes coupling effect; therefore the LED lamp needs very small current compared to the conventional tungsten lamp. The LED lamp has many advantages such as compact volume, long-term life time, lower threshold voltage, higher lighting efficiency, cold light source, lower power consumption, fast response rate, excellent vibration-proof ability and good monochromatism to be regarded as a green light source. Nowadays, the LED lamp is popularly used for home appliances, telephones, panel illuminators, fog lights for cars, traffic lights and etc. Also, the LED lamp is widely used for outdoor landscape illuminating such as for light box advertising, nightscape lighting in building, light spotting, light projecting and lightening on inter land.

For indoor illumination, various decorative LED lamps using different compounds of semiconductor material and element to provide varied LED structures are developed to fulfill colorful LED lamps with red, orange, yellow, green, blue and purple and even dynamic or entertainment illumination by lighting arrangement or circuit control. However, the conventional LED lamp usually utilizes multiple LED dies each emitting specific color densely arranged to provide a monochromatic light. Or multiple LED dies with various colors are combined and mixed together to a colorful lamp, and a circuit control is introduced to adjust the lamp to provide different color and brightness for the illumination. In the conventional LED lamp, large amount of LED dies occupy the space, which will limit the design of size and installation for the LED lamp. Therefore, in order to promote the competition ability of the LED lamp, there is a need to improve the structure and function of the conventional LED lamp.

SUMMARY OF THE INVENTION

The present invention provides a LED illumination device utilizes sound control to change the light emitted from each LED die, so that the illuminating light mixed from the emitting light of the LED dies of the LED illumination device can vary in color and brightness to provide more amusement.

Furthermore, the LED illumination device includes a ceramic substrate to integrate a plurality of LED dies and a control circuit together so that a volume of the LED illumination device can be reduced and the heat dissipation of the LED illumination device can be enhanced.

According to the present invention, the LED illumination device includes a housing, a ceramic substrate, a plurality of LED dies, a diffusion film, a sound sensor and a control circuit. The housing includes a base portion and a mask portion covered on the base portion. The ceramic substrate is installed inside the base portion. The LED dies are mounted on one surface of the ceramic substrate to emit lights with different colors. The diffusion film encloses the LED dies so that the emitting light of the LED dies are uniformly mixed and diffuse in a monochromatic light to illuminate through the mask portion. The sound sensor is mounted on the base portion for detecting surrounding sound in order to generate a response signal. The control circuit is mounted on the other surface of the ceramic substrate and electrically connected with the LED dies and the sound sensor, for receiving the response signal to control a light intensity of each LED die so that the monochromatic light is adjusted to provide different brightness and color.

According to the present invention, the base portion of the LED illumination device provides a standard lamp interface so that the LED illumination device can match the conventional lamp to replace the tungsten bulb device and the likes. Moreover, the base portion includes a plurality of fins for effective heat dissipation. Therefore, heat generated from the LED illumination device is easily to be dissipated to prolong the lift time. The LED illumination device of the invention is advantaged as the environment-friendly, energy saving, easy controlling and safety using product, which can be supplied for a large range of AC voltage as the power input.

Furthermore, a volume of the sound can be used for a sound control circuit of the sound sensor to control the brightness of the illumination light of the LED illumination device, and a frequency of the sound can be used to control a color change rate of LED dies. As such, the LED illumination device of the present invention can provide varied illumination according to the tempo and volume of music, for example, to provide more cheerful and joyful feeling.

The present invention will become obvious to those of ordinary skill in the art after reading the following detailed description of the preferred embodiment.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

Figure 1A:
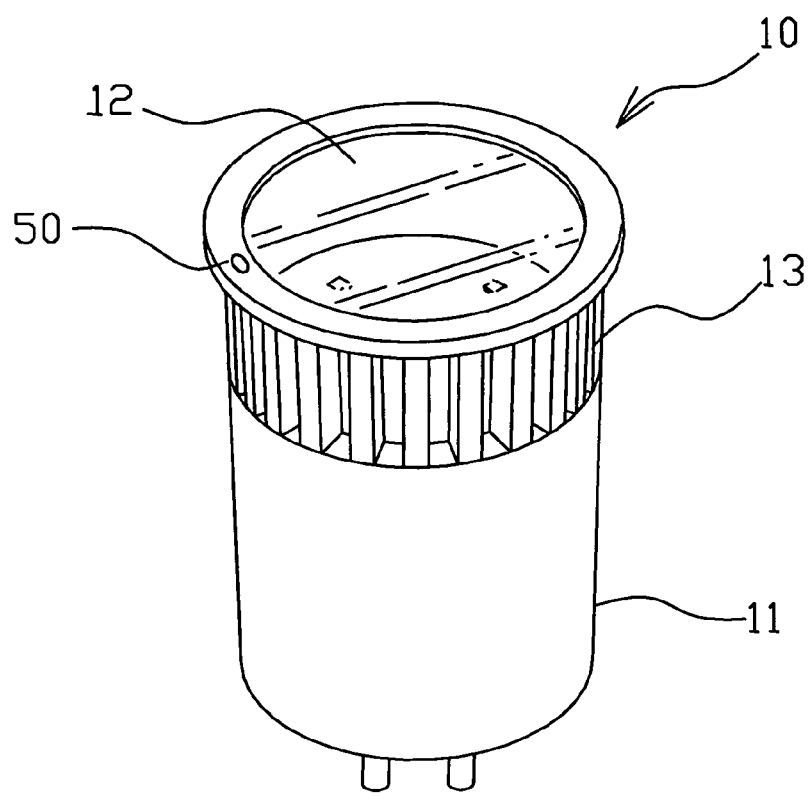
FIGS. 1A and 1B show a perspective view and a cross sectional view of the present invention.
Figure 1B:
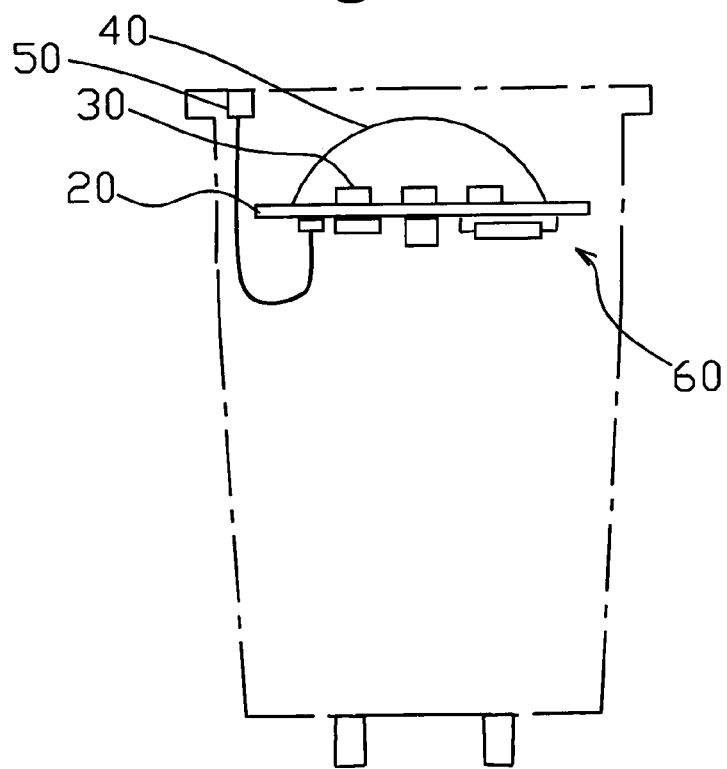
Figure 2:
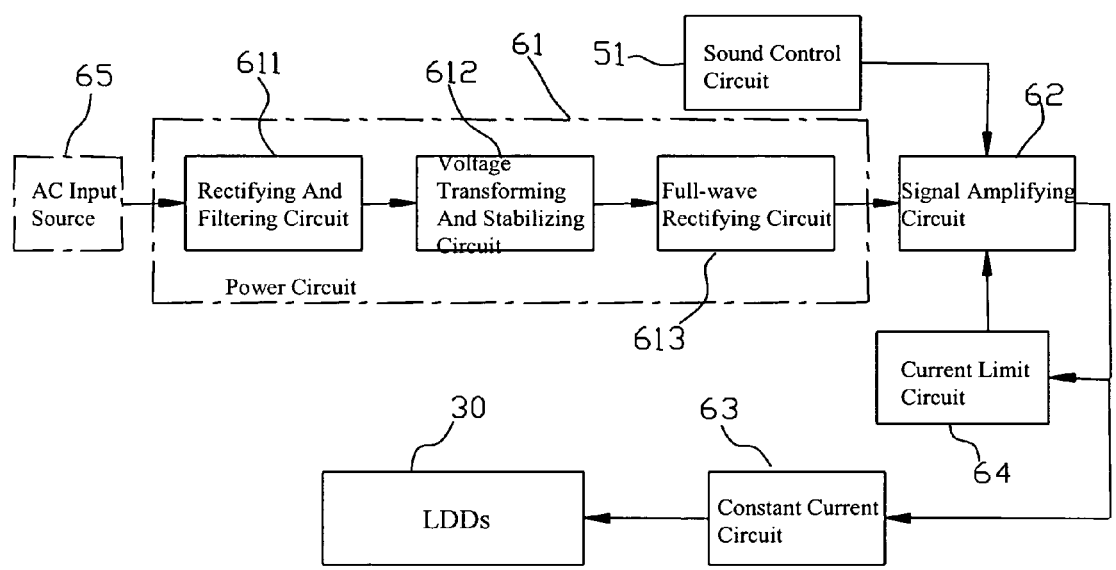
FIG. 2 is a block diagram of a control circuit of the present invention.

As shown in FIGS. 1A and 1B, a sound control for changing light color of a LED illumination device provided by the present invention includes a housing 10, a ceramic substrate 20, a plurality of LED dies 30, a diffusion film 40, a sound sensor 50 and a control circuit device 60. The housing 10 includes a base portion 11 and a mask portion 12. The base portion 11 provides a standard E27 lamp interface and includes a plurality of fins 13 formed around the top for effective heat dissipation. The sound sensor 50 is mounted outside the base portion 11 for detecting surrounding sound to generate a response signal. The mask portion 12 is covered on the base portion 11. The ceramic substrate 20 installed inside the base portion 10 has three LED dies 30 including red (R), green (G) and blue (B) LED dies mounted thereon. The LED dies 30 are enclosed by the diffusion film 40 so that the red, green and blue lights emitted from the LED dies 30 can be uniformly mixed to diffuse in a monochromatic color to illuminate through the mask portion 12. Moreover, the control circuit device 60 is mounted on a bottom surface opposite to the LED dies 30. The control circuit device 60 is electrically connected with the LED dies 30 and the sound sensor 50 so that the control circuit device 60 can receive the response signal from the sound sensor 50 to control the light emitting from each of the red, green and blue LED dies 30. That is, the light intensity provided from each LED die 30 will be different as the sound sensor 50 detects the variation of the surrounding sound. Therefore, the light color and brightness illuminating from the LED illumination device of the present invention can change Accordingly, As shown in FIG. 2, in a preferred embodiment, the control circuit device 60 includes a power circuit 61, a signal amplifying circuit 62, a constant current circuit 63 and an current limit circuit 64. The power circuit 61 is connected to the signal amplifying circuit 62. The signal amplifying circuit 62 has a first input to connect with an output of a sound control circuit 51 of the sound sensor 50. The output of the sound control circuit 51 is connected to an input of the constant current circuit 63. An output of the constant current circuit 63 is connected to an input of each LED die 30. An output of the current limit circuit 64 is connected to a second input of the signal amplifying circuit 62. Besides, the power circuit 61 includes a rectifying and filtering circuit 611 connected to a voltage transforming and stabilizing circuit 612 which is connected to a full-wave rectifying circuit 613. An AC (alternative current) input source 65 is connected to an input of the rectifying and filtering circuit 611. An output of the full-wave rectifying circuit 613 is connected to an input of the signal amplifying circuit 62. The operation principle is described as below.

The AC input source 65 supplies 85~240V AC power to the rectifying and filtering circuit 611 for rectification and filtration to output 85~240V DC (direct current) power. The 85~240V DC power inputted to the voltage transforming and stabilizing circuit 612 is outputted as a working voltage with a stabilized voltage of 6V. The working voltage then inputs to the full-wave rectifying circuit 613 for noise filtration and full-wave rectification to obtain a linear current power to be inputted to the signal amplifying circuit 62. In a preferred embodiment, a volume of the sound is used for the sound control circuit 51 of the sound sensor 50 to control the brightness of the illumination light. A frequency of the sound is used to control a color change rate of three RGB LED dies 30. The sound control circuit 51 outputs continually varying response signals to the signal amplifying circuit 62 so that a current with different value outputted from the signal amplifying circuit 62 is determined by the amplified signal to control each LED die 30. As such, each LED die 30 can emit light with varying intensity and the LED illumination device of the present invention can thus provide various types for the illuminating light, for example, a gradually color changing light, a glinting light and etc. The above-mentioned sound controlling mode can be changed by programming of the sound control circuit 51. Moreover, The current limit circuit 64 can limit the outputted current value of the signal amplifying circuit 62. Three outputted currents from the signal amplifying circuit 62 then input to the constant current circuit 63 so that three constant currents are obtained to supply for three R, G, B LED dies 30 to emit light, respectively.

Figure 3:
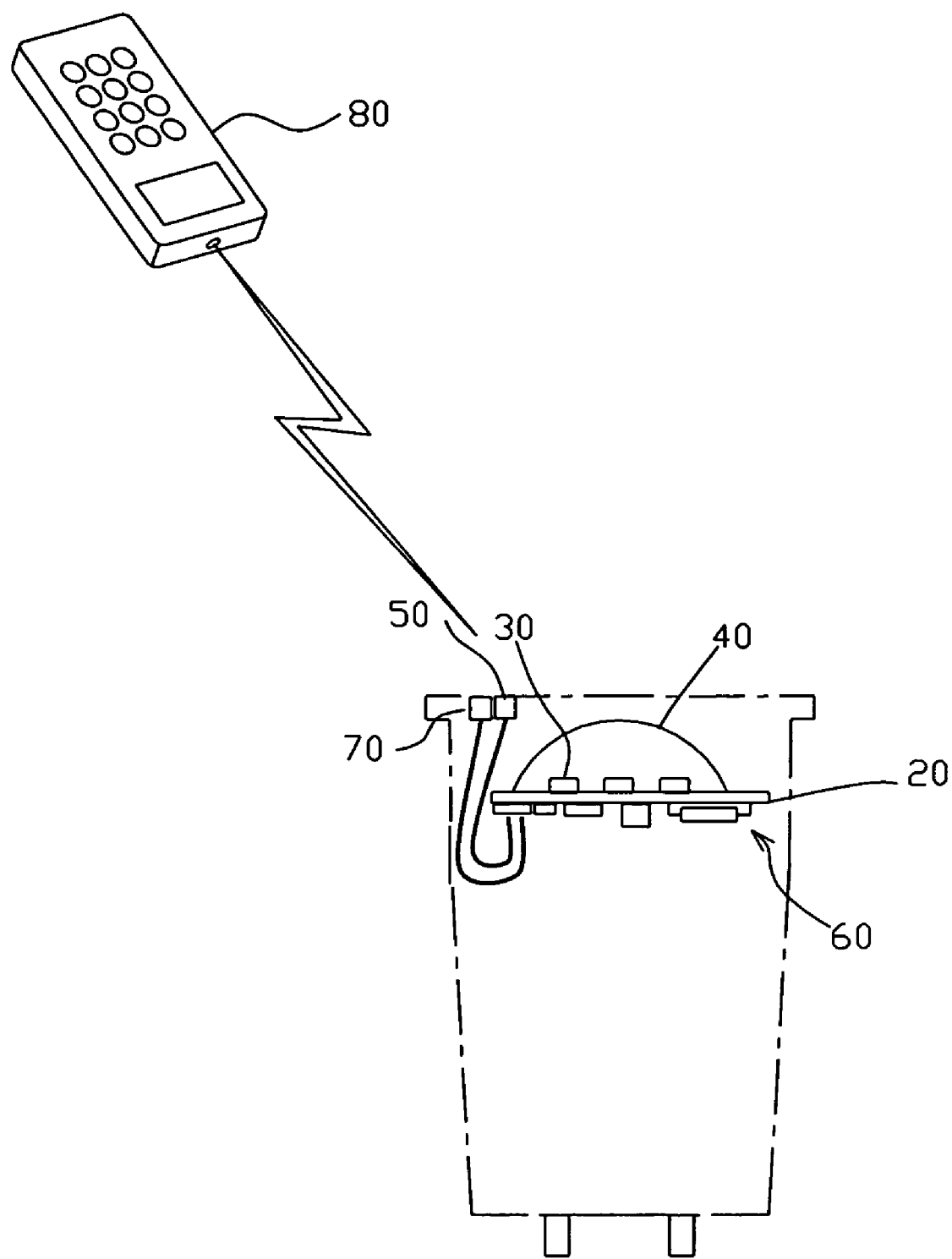
FIG. 3 shows another preferred embodiment of the present invention.

As shown in FIG. 3, in another preferred embodiment, the LED illumination device of the present invention further includes an IR (infrared) device 70 connected to the control circuit 60 for receiving IR signals. The user can utilizes an IR remote 80 to control the IR device 70. The IR device 70 will then send a control signal to the control circuit 60 for the control circuit 60 to adjust the light intensity of each LED die 30, or turn on/off the control of the sound control circuit 51 of the sound sensor 50 according to the control signal. That is, the LED illumination device of the present invention can use IR remote control mode to achieve the purpose of illuminating light change. The IR remote control mode can be used for ordinary illumination. On the other hand, using IR remote control to switch to the sound control mode by the sound sensor 50. The sound control mode can be used for generating light illumination with various visual effects.

The embodiment above is only intended to illustrate the present invention; it does not, however, to limit the present invention to the specific embodiment. Accordingly, various modifications and changes may be made without departing from the spirit and scope of the present invention as described in the following claims.

What is claimed is:

1. A LED (light emitting diode) illumination device comprising:
    a housing including a base portion and a mask portion covered on the base portion;
    a ceramic substrate installed inside the base portion;
    a plurality of LED dies mounted on one surface of the ceramic substrate to emit lights with different colors;
    a diffusion film enclosing the LED dies so that the emitting light of the LED dies are uniformly mixed and diffuse in a monochromatic light to illuminate through the mask portion;
    a sound sensor mounted on the base portion for detecting surrounding sound in order to generate a response signal; and
    a control circuit mounted on the other surface of the ceramic substrate and electrically connected with the LED dies and the sound sensor, for receiving the response signal to control a light intensity of each LED die so that the monochromatic light is adjusted to provide different brightness and color.

2. The LED illumination device of claim 1, wherein the LED dies includes three.

3. The LED illumination device of claim 2, wherein the LED dies are red (R), green (G) and blue (B) LED dies.

4. The LED illumination device of claim 1, further comprising an IR (infrared) device connected to the control circuit, for receiving an IR signal to send a control signal to the control circuit.

5. The LED illumination device of claim 4, wherein the control circuit receives the control signal to control the light intensity of each LED die.

6. The LED illumination device of claim 4, wherein the control circuit receives the control signal to determine whether to receive the response signal or not.

7. The LED illumination device of claim 1, wherein the response signal is transferred to an electrical signal and a variation of the electrical signal makes the intensity of light emitting from each LED die changed.

8. The LED illumination device of claim 1, wherein the control circuit includes a constant current circuit connected to the LED dies to output a constant current to each LED die.

9. The LED illumination device of claim 8, wherein the control circuit further includes a power circuit and a signal amplifying circuit, the power circuit is connected to the signal amplifying circuit and the sound sensor is connected to the signal amplifying circuit and the constant current circuit.

10. The LED illumination device of claim 9, wherein the control circuit further includes a current limit circuit connected to the signal amplifying circuit.

11. The LED illumination device of claim 9, wherein the power circuit includes a rectifying and filtering circuit, a voltage transforming and stabilizing circuit and a full-wave rectifying circuit, an input source is connected to the rectifying and filtering circuit which is connected to the voltage transforming and stabilizing circuit, and the voltage transforming and stabilizing circuit is connected to the full-wave rectifying circuit which is connected to the signal amplifying circuit.

12. The LED illumination device of claim 1, wherein the base portion includes a plurality of fins for heat dissipation.

* * * * *